(12) United States Patent
Sakai et al.

(10) Patent No.: US 8,422,085 B2
(45) Date of Patent: Apr. 16, 2013

(54) IMAGE READER AND IMAGE FORMING APPARATUS

(75) Inventors: Tetsuya Sakai, Toyokawa (JP); Masahiro Kouzaki, Toyohashi (JP); Shigeki Naiki, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 716 days.

(21) Appl. No.: 12/488,109

(22) Filed: Jun. 19, 2009

(65) Prior Publication Data

US 2009/0316229 A1 Dec. 24, 2009

(30) Foreign Application Priority Data

Jun. 19, 2008 (JP) ................. 2008-160472

(51) Int. Cl.
| | | |
|---|---|---|
| *H04N 1/40* | (2006.01) | |
| *H04N 1/04* | (2006.01) | |
| *G06K 15/00* | (2006.01) | |
| *G06K 9/40* | (2006.01) | |
| *G03G 15/043* | (2006.01) | |
| *G03G 15/00* | (2006.01) | |
| *G03G 15/01* | (2006.01) | |
| *G03G 21/00* | (2006.01) | |

(52) U.S. Cl.
USPC .......... 358/474; 358/461; 358/1.14; 382/274; 382/254; 399/52; 399/15; 399/301; 399/350; 399/353

(58) Field of Classification Search ............... 358/474; 382/274; 399/52, 15, 301
See application file for complete search history.

(56) References Cited

U.S. PATENT DOCUMENTS

| | | | | |
|---|---|---|---|---|
| 5,754,921 | A | * | 5/1998 | Imaizumi et al. .............. 399/52 |
| 6,023,532 | A | * | 2/2000 | Kanesaka et al. ............. 382/274 |
| 6,862,117 | B1 | * | 3/2005 | Ford et al. .................... 358/475 |
| 2004/0028291 | A1 | * | 2/2004 | Broddin et al. ............... 382/284 |
| 2005/0047834 | A1 | * | 3/2005 | Tomita et al. ................. 399/301 |
| 2005/0281596 | A1 | * | 12/2005 | Nakagawa et al. ........... 399/350 |
| 2008/0175606 | A1 | * | 7/2008 | Okada ............................ 399/15 |
| 2008/0187336 | A1 | * | 8/2008 | Itagaki .......................... 399/52 |

FOREIGN PATENT DOCUMENTS

| | | |
|---|---|---|
| JP | 10-322555 | 12/1998 |
| JP | 2002-192815 | 7/2002 |
| JP | 2005-33465 | 2/2005 |
| JP | 2005-311952 | 11/2005 |
| JP | 2007-214944 | 8/2007 |

OTHER PUBLICATIONS

Japanese Notice of Reason for Refusal mailed May 11, 2010, directed to corresponding Japanese Patent Application No. 2008-160472; 8 pages.

* cited by examiner

*Primary Examiner* — Charlotte M Baker
*Assistant Examiner* — Rury Grisham
(74) *Attorney, Agent, or Firm* — Morrison & Foerster LLP

(57) ABSTRACT

There are provided an image reader with high resolution capability for images in a high density range and an image forming apparatus. An image reader 2 comprises a reflected light reading unit (11, 12, 13, 14, 10) for irradiating a surface to be read of an original sheet with a light and reading the amount of the reflected light and a transmitted light reading unit (15, 12, 13, 14, 10) for irradiating the original sheet with a light and reading the amount of the transmitted light, and calculates the density of an image of the original sheet based on the amount of the reflected light read by the reflected light reading unit and the amount of the transmitted light read by the transmitted light reading unit.

8 Claims, 4 Drawing Sheets

IMAGE READER AND IMAGE FORMING APPARATUS

This application is based on application No. 2008-160472 filed in Japan, the contents of which are hereby incorporated by reference.

BACKGROUND OF THE INVENTION

The present invention relates to an image reader and an image forming apparatus having an image reading function.

Image readers project light onto an original sheet and detect the amount of the reflected light in every pixel to be read for determining image density (gradation). In image reading, an error is generated in the read density due to various factors.

Disclosed in JP H10-322555 A is a technique for detecting the amount of irregular reflection light in order to correct an error caused by glossiness of an original sheet page. Disclosed in JP 2002-192815 A are a technique for providing two reading means in order to achieve reading of both sides of an original sheet page, and a technique for compensating a difference in read sensitivity between two surfaces. Disclosed in JP 2005-33465 A is a technique for providing a CIS (Contact Image Sensor) in order to read the back side of an original sheet.

In the image readers which read the reflected light, a change in the amount of the reflected light is small in a high density range, which causes a problem of low resolution capability for high-density images.

SUMMARY OF THE INVENTION

In view of the above problem, an object of the present invention is to provide an image reader and an image forming apparatus with high image resolution capability for high density range.

In order to accomplish the above object, an image reader of one aspect of the present invention includes a reflected light reader which irradiates a surface to be read of an original sheet with a light and reads an amount of a reflected light, and a transmitted light reader which irradiates the original sheet with light and reads an amount of the transmitted light, in which density of an image of the original sheet is calculated based on the amount of the reflected light read by the reflected light reader and the amount of the transmitted light read by the transmitted light reader.

With this configuration, the image density of an original sheet is calculated with use of the amount of the reflected light which can ensure high resolution when the image density of the original sheet is low and the amount of the transmitted light which can ensure high resolution when the image density of the original sheet is high, so that the image reader can read image with high resolution regardless of image density.

In the above-mentioned image reader, when the density of a pixel calculated based on the amount of the reflected light read by the reflected light reader is high, the density of the pixel calculated based on the amount of the transmitted light read by the transmitted light reader may be determined to be the density of the image of the original sheet.

With this configuration, image density of an original sheet is calculated with use of either the amount of the reflected light or the amount of the transmitted light, which ensures higher resolution, depending on the image density of the original sheet, so that the image reader can read image with high resolution regardless of image density.

In the above-mentioned image reader, the reflected light reader may have a reflection projector which projects a light to a surface to be read of the original sheet, the transmitted light reader may have a transmission projector which projects a light to a back side of the surface to be read of the original sheet, and the reflected light reader and the transmitted light reader may share a light amount detector which detects the amount of the reflected light of the original sheet and the amount of the transmitted light of the original sheet.

With this configuration, only one light amount detector is necessary, and so only one optical system and signal processing circuit are necessary for light reception, which contributes to prevention of cost increase.

In the above-mentioned image reader, the reflected light reader and the transmitted light reader may share a projector which projects a light to the surface to be read of the original sheet, in which the reflected light reader may have a reflected light amount detector which detects the amount of the reflected light of the original sheet, and the transmitted light reader may have a transmitted light amount detector which is placed on an opposite side of the surface to be read of the original sheet and detects the amount of the transmitted light of the original sheet.

With this configuration, the amount of the reflected light and the amount of the transmitted light can be detected simultaneously, which makes it possible to reduce the time taken for reading.

The image forming apparatus in one aspect of the present invention has any one of the aforementioned image readers.

With this configuration, an original image can be copied with gradation accurately reproduced.

According to the aforementioned configuration, image density of an original sheet can be calculated with high resolution based on the amount of the transmitted light even when the image density is high, so that images can be read with high image resolution regardless of image density.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE PREFERRED EMBODIMENTS

Figure 1:
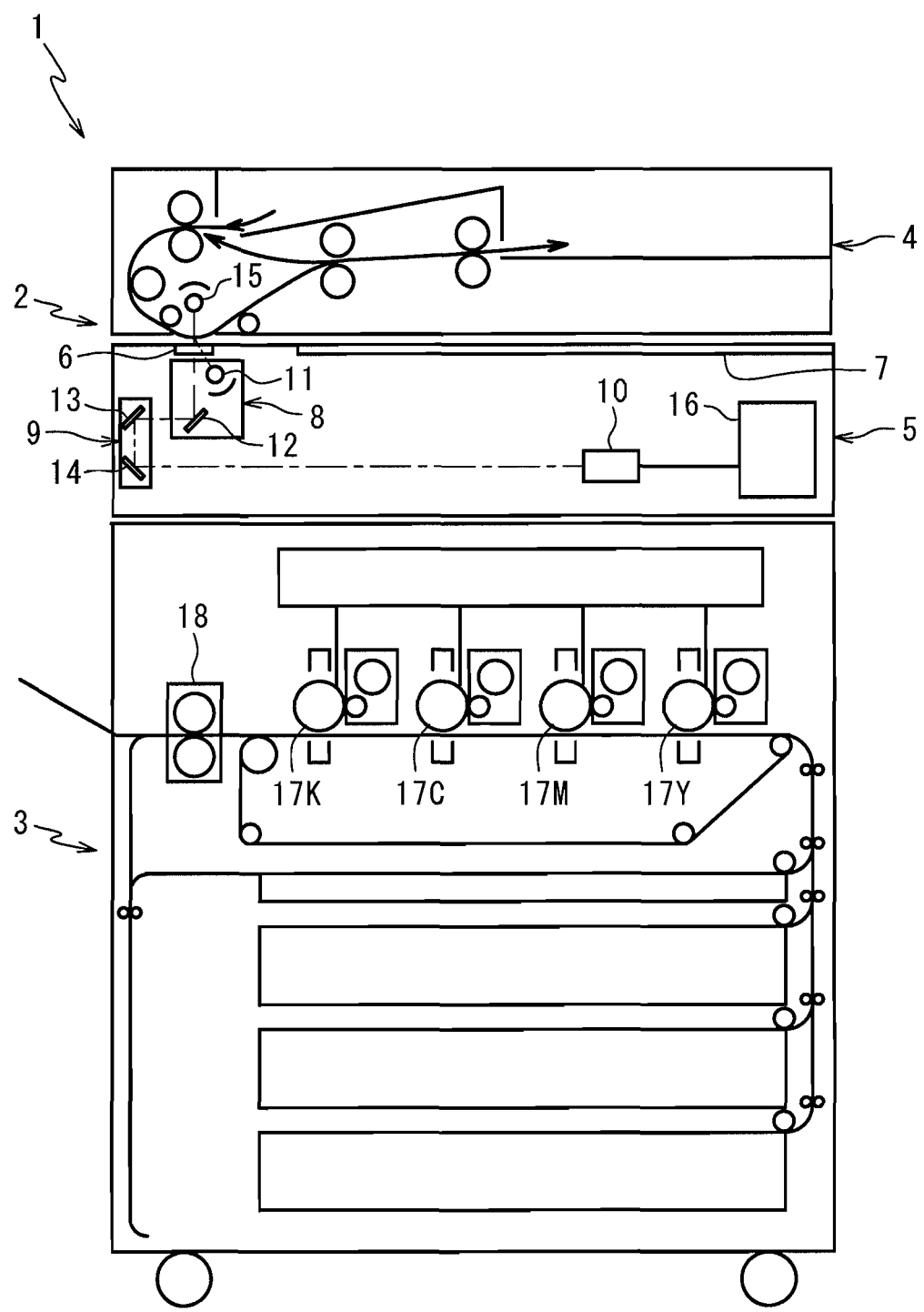
FIG. 1 is a schematic view of an image forming apparatus as a first embodiment of the present invention.

FIG. 1 shows an image forming apparatus 1 according to a first embodiment of the invention. The image forming apparatus 1 is composed of an image reader section 2 and a body section 3.

The image reader section 2 has an automatic sheet conveying section 4 for automatic feeding and reverse feeding of original sheets, and a scanner section 5. The scanner section 5 has a slit glass 6 facing the surface to be read of an original sheet while the original sheet is being conveyed by the automatic document conveying section 4, a platen 7 made of plate glass for mounting an original sheet thereon, a scanning unit 8 and a reflective unit 9 which move in the horizontal direction under the slit glass 6 and the platen 7, and a light receiving sensor (light amount detector) 10 which is constituted of, for example, a CCD.

The scanning unit 8 is composed of a reflection projector 11 which is a light emitter for projecting light to the surface to be read of an original sheet, and a first reflecting mirror 12 for bending the light projected by the reflection projector 11 and reflected by the original sheet. The reflective unit 9 has a second reflecting mirror 13 and a third reflecting mirror 14 for further bending the reflected light of the original sheet, which has been bent by the first reflector 12, and guiding the bent light to a light receiving sensor 10. The reflective unit 9 moves depending on the position of the scanning unit 8 so as to make the path of the reflected light from the surface to be read of the original sheet to the light receiving sensor 10 a fixed length. Thus, the light receiving sensor 10 can accurately detect the amount of the reflected light of the surface to be read of the original sheet (the reflected light amount detection).

The automatic document conveying section 4 has a transmission projector 15 which is a light emitter for projecting light to an original sheet, which faces the slit glass 6, from the back side. The light receiving sensor 10 can receive the transmitted light, which has been projected by the transmission projector 15 and has transmitted through the original sheet, via the first through third reflecting mirrors 12, 13, 14, and can also detect the amount of the transmitted light (the transmitted light amount detection). The automatic document conveying section 4 further has an arithmetic unit 16 for processing the amount of light detected by the light receiving sensor 10 to calculate the image density of the original sheet.

Thus, in the image reader section 2, the reflected light reading unit having the reflection projector 11 and the transmitted light reading unit having the transmission projector 15 share the first through the third reflecting mirrors 12, 13, 14 and the light receiving sensor 10.

The body section 3 is a publicly known image forming apparatus of electrostatic printing method, in which imaging sections 17Y, 17M, 17C, 17K respectively form images on recording paper with use of toner of yellow, magenta, cyan and black, and a fixing device 18 fixes the toner images to the recording paper.

In the present embodiment, in the image reader section 2, the amount of the reflected light and the amount of the transmitted light of an original sheet can be detected while being scanned in every pixel to be read by the light receiving sensor 10, so that the image density of the original sheet can be calculated based on the amount of the reflected light and the amount of the transmitted light. Further, the calculated image density of the original sheet can be reflected on formation of toner images in the imaging sections 17Y, 17M, 17C, 17K.

If the reflection projector 11 and the transmission projector 15 project light at the same time, the light receiving sensor 10 ends up detecting the sum of the amount of the reflected light and the amount of the transmitted light. Therefore, the image reader section 2 first conveys an original sheet with the surface to be read of the original sheet facing the slit glass 6, while projecting light to the original sheet by the reflection projector 11, and detects the amount of the reflected light by the light receiving sensor 10. Next, the image reader section 2 reversely feeds the original sheet, projects light to the surface to be read of the original sheet by the transmission projector 15, and detects the amount of the transmitted light by the light receiving sensor 10.

Figure 2:
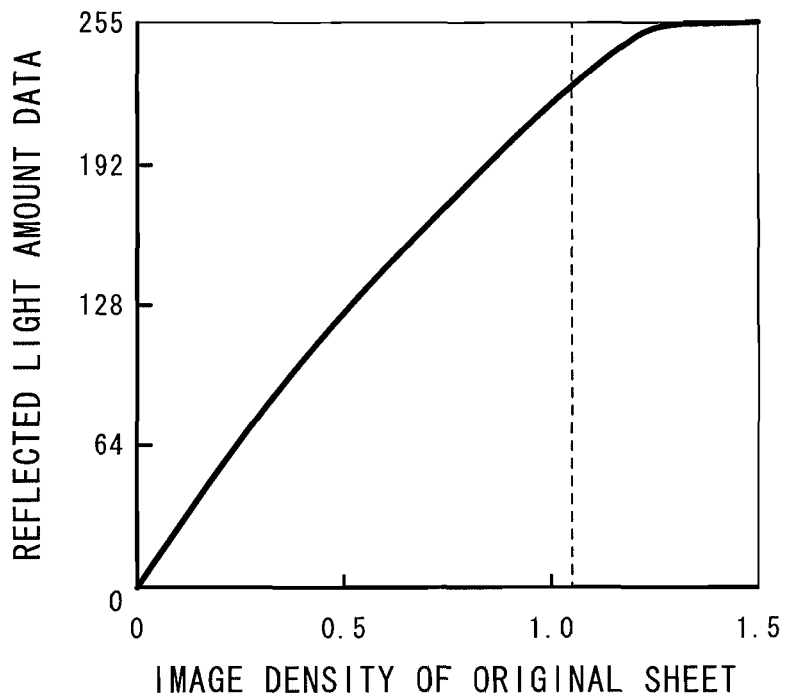
FIG. 2 is a view showing the relation between the density of an original sheet and the amount of the reflected light in the image forming apparatus of FIG. 1.

FIG. 2 shows the relation between the amount of the reflected light and the density of an original sheet. It is to be noted that values of the reflected light amount data in the drawing are calibrated so that the amount of the reflected light may be set to "255" in a margin portion of the original sheet. More specifically, the calibration is an operation to correct variation in the amount of the reflected light due to the difference in the ground color of the original sheet (color of the paper sheet). As shown in the drawing, when the density of an original sheet is high, the amount of the reflected light hardly has any difference and therefore it is impossible to determine the density of the original sheet from the reflected light amount data with fine precision.

Figure 3:
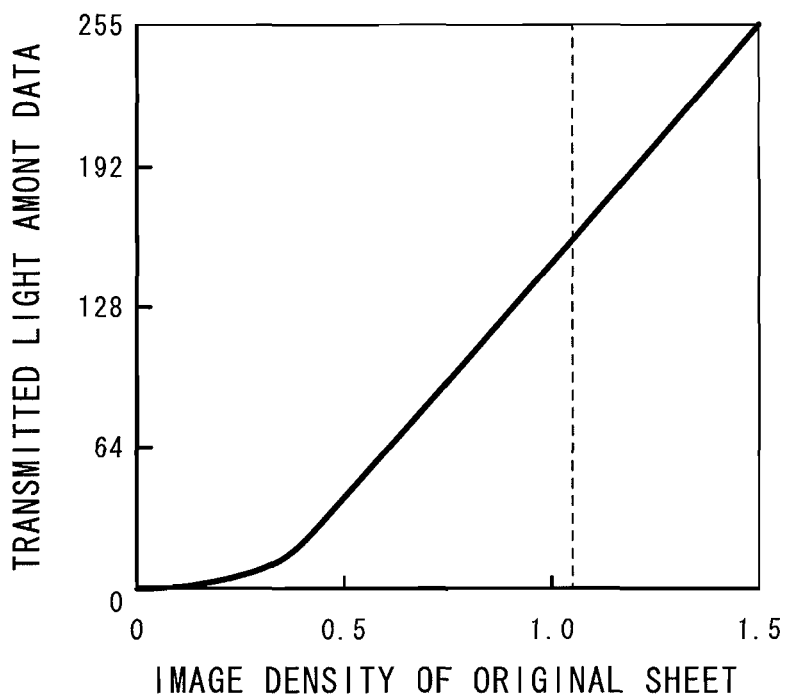
FIG. 3 is a view showing the relation between the density of an original sheet and the amount of the transmitted light in the image forming apparatus of FIG. 1.

Similarly, FIG. 3 shows the relation between the amount of the transmitted light and the density of an original sheet. Since the amount of the transmitted light is in negative correlation with the image density, values (complements) obtained by subtracting detection values from the amount of the transmitted light in the margin portion of the original sheet are calibrated so that the data value may be set to "255" when the detected light amount is "0". More specifically, this calibration is an operation to correct variation in the amount of the transmitted light due to the difference in the thickness and the quality of the original sheet. As shown in the drawing, when the density of the original sheet is low, it is impossible to determine precisely the image density of the original sheet from the transmitted light amount data, whereas when the image density of the original sheet is high, it becomes possible to determine precisely the image density.

Therefore, in the present embodiment, if the density of the original sheet calculated from the reflected light amount data is 1.1 or more, then the density of the original sheet calculated from the transmitted light amount data is recognized as an image density of the original sheet.

Figure 4:
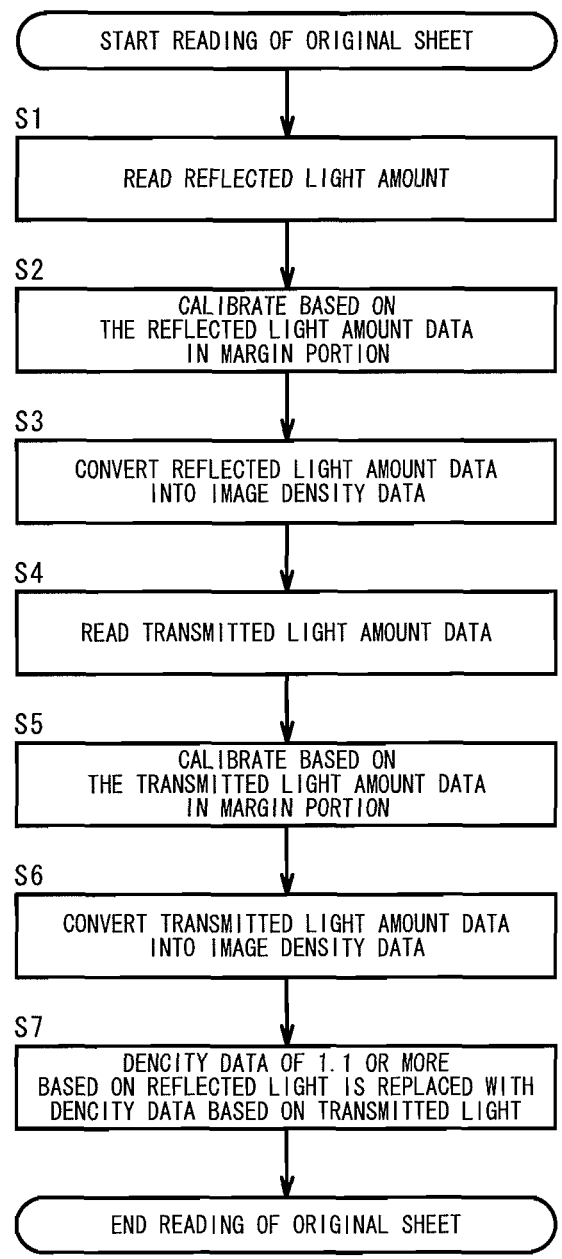
FIG. 4 is a flow chart showing the operation procedures of the image reading in the image forming apparatus of FIG. 1.

FIG. 4 shows the operation procedures of the above-stated reading of an original sheet. First, in Step S1, only the reflection projector 11 is lit, the automatic sheet conveying section 4 feeds an original sheet on the slit glass 6 with the surface to be read facing down, and the light receiving sensor 10 reads the amount of the reflected light. The light amount data on one page of the original sheet read in this way is temporarily stored in an internal memory of the arithmetic unit 16. In Step S2, the arithmetic unit 16 extracts data on the margin portion of the original sheet out of this data, calibrates the light amount data on the entire original sheet, and stores the calibrated data in the memory. In Step S3, the reflected light amount data is converted per pixel into density data with reference to a reference table which expresses the relation of FIG. 2 with numerical values.

In Step S4, only the transmission projector 15 is lit, the automatic sheet conveying section 4 reversely feeds the original sheet conveyed in Step S1, detects the amount of the transmitted light by the light receiving sensor 10, and temporarily stores the light amount data on one page of the original sheet in the memory. In Step S5, the arithmetic unit 16 extracts the data on the margin portion of the original sheet out of this data, calibrates the light amount data of the entire original sheet, and stores the complement data for the calibrated light amount data in the memory. In Step S6, the transmitting light amount complement data is converted per pixel into density data with reference to a reference table which expresses the relation of FIG. 3 with numerical values.

Finally in Step S7, data on image density by the reflected light is checked for every pixel, and if their values are 1.1 or more, then the data is replaced with data on pixel positions corresponding to the image density by the transmitted light.

Thus-obtained read image data has high resolution in the range from low density to high density. Particularly when the original sheet includes a photographic image including a shadow area, it is difficult to read the shadow area with high resolution with use of only the reflected light. However, using the transmitted light for the shadow area makes it possible to read the entire original sheet with high resolution. Moreover, an image is formed based on this image data in the body section 3, so that the image forming apparatus 1 can copy the image of an original sheet with accurate gradation.

Figure 5:
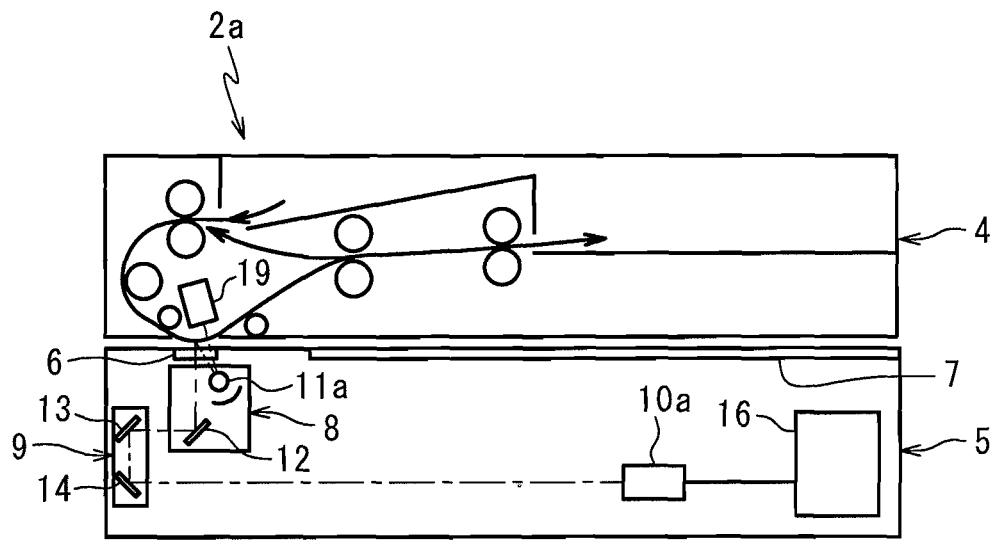
FIG. 5 is a schematic view of an image reader as a second embodiment of the invention.

FIG. 5 shows an image reader 2a in a second embodiment of the invention. Although this embodiment is presented as an independent image reader, it may be incorporated in image forming apparatuses such as copy machines and facsimiles as in the case of the first embodiment. In description of the present embodiment and subsequent embodiments, component members similar to those described before will be denoted with the similar reference numerals to omit redundant explanation.

In the present embodiment, the automatic sheet conveying section 4 has a transmitted light amount detector 19 constituted of, for example, a CIS (Contact Image Sensor) provided on the opposite side of the surface to be read of an original sheet for detecting the amount of the transmitted light which has been projected by a projector 11a and has transmitted the original sheet. In the image reader 2a, a light receiving sensor 10a is a reflected light amount detector which detects only the amount of the reflected light.

More specifically, in the image reader section 2a reflected light reading unit having the reflected light amount detector 10a and the transmitted light reading unit having the transmitted light amount detector 19 share one projector 11a.

In the present embodiment, both the amount of the reflected light and the amount of the transmitted light can simultaneously be detected by passing the original sheet through the image reader only once, and therefore high-speed image reading can be implemented.

Figure 6:
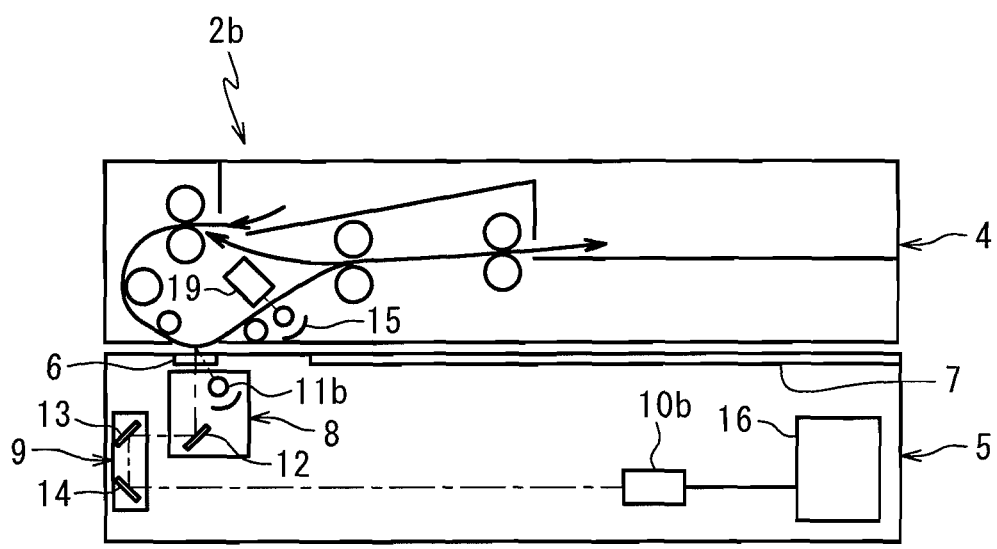
FIG. 6 is a schematic view of an image reader as a third embodiment of the invention.

In a third embodiment as shown in FIG. 6, an image reader 2b is provided with a reflection projector 11b and a transmission projector 15 separately, and further a reflected light amount detector 10b and a transmitted light amount detector 19 are provided separately.

Layout of the projector for obtaining the reflected light and the transmitted light and the light amount detector is not limited to specific layout in the embodiments but may be changed arbitrarily.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image reader, comprising:
   a reflected light reader which irradiates a surface to be read of an original sheet with a light and reads an amount of a reflected light; and
   a transmitted light reader which irradiates the original sheet with a light and reads an amount of a transmitted light, wherein
   the density of an image of the original sheet is calculated based on the amount of the reflected light read by the reflected light reader and the amount of the transmitted light read by the transmitted light reader.

2. The image reader according to claim 1, wherein
   when a density of a pixel calculated based on the amount of the reflected light read by the reflected light reader is high, the density of the pixel calculated based on the amount of the transmitted light read by the transmitted light reader is determined to be the density of the image of the original sheet.

3. The image reader according to claim 1, wherein
   the reflected light reader has a reflection projector which projects a light to the surface to be read of the original sheet,
   the transmitted light reader has a transmission projector which projects a light to a back side of the surface to be read of the original sheet, and
   the reflected light reader and the transmitted light reader share a light amount detector which detects the amount of the reflected light of the original sheet and the amount of the transmitted light of the original sheet.

4. The image reader according to claim 1, wherein
   the reflected light reader and the transmitted light reader share a projector which projects a light to the surface to be read of the original sheet, wherein
   the reflected light reader has a reflected light amount detector which detects the amount of the reflected light of the original sheet, and
   the transmitted light reader has a transmitted light amount detector which is placed on an opposite side of the surface to be read of the original sheet and detects the amount of the transmitted light of the original sheet.

5. An image forming apparatus having an image reader comprising:
   a first reader provided in the image reader, which irradiates a surface to be read of an original sheet with a light and reads an amount of a reflected light; and
   a second reader provided in the image reader, which irradiates the original sheet with a light and reads an amount of a transmitted light, wherein
   the density of an image of the original sheet is calculated based on the amount of the reflected light read by the first reader and the amount of the transmitted light read by the second reader.

6. The image forming apparatus according to claim 5, wherein
   when a density of a pixel calculated based on the amount of the reflected light read by the first reader is high, the density of the pixel calculated based on the amount of the transmitted light read by the second reader is determined to be the density of the image of the original sheet.

7. The image forming apparatus according to claim 5, wherein
   the first reader has a reflection projector which projects a light to the surface to be read of the original sheet,
   the second reader has a transmission projector which projects a light to a back side of the surface to be read of the original sheet, and
   the first reader and the second reader share a light amount detector which detects the amount of the reflected light of the original sheet and the amount of the transmitted light of the original sheet.

8. The image forming apparatus according to claim 5, wherein
   the first reader and the second reader share a projector which projects a light to the surface to be read of the original sheet, wherein the first reader has a reflected light amount detector which detects the amount of the reflected light of the original sheet, and the second reader has a transmitted light amount detector which is placed on an opposite side of the surface to be read of the original sheet and detects the amount of the transmitted light of the original sheet.

\* \* \* \* \*